US012739562B2

(12) United States Patent
Rumelt et al.

(10) Patent No.: US 12,739,562 B2
(45) Date of Patent: Sep. 15, 2026

(54) SYSTEMS AND METHODS FOR MINIMIZING SPEAKER DISTORTION

(71) Applicant: Cirrus Logic International Semiconductor Ltd., Edinburgh (GB)

(72) Inventors: Andrew Rumelt, Austin, TX (US); Dana J. Taipale, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 499 days.

(21) Appl. No.: 18/182,600

(22) Filed: Mar. 13, 2023

(65) Prior Publication Data

US 2024/0187787 A1 Jun. 6, 2024

Related U.S. Application Data

(60) Provisional application No. 63/430,407, filed on Dec. 6, 2022.

(51) Int. Cl.
*H04R 3/02* (2006.01)

(52) U.S. Cl.
CPC .................................... *H04R 3/02* (2013.01)

(58) Field of Classification Search
CPC ...... H04R 3/02; H04R 3/007; H04R 2430/03; H04R 3/04; H04R 1/1058; H04R 3/005; H04R 5/04; H04R 25/505; H04R 25/604; H03G 5/00; H03G 9/025; H03G 3/3005; H03G 5/005; H03G 5/165; A61N 1/3904; G10K 11/17853; G10L 19/12; G10L 21/0208; G10L 21/023; G10L 21/0364
See application file for complete search history.

(56) References Cited

U.S. PATENT DOCUMENTS 1,685,913 A * 10/1928 Espenschied ............ H04R 3/04 369/175
8,301,281 B2 * 10/2012 Sato ...................... G10L 21/038 381/61
8,422,697 B2 * 4/2013 Christoph ........... G10L 21/0208 381/94.1
10,083,706 B2 * 9/2018 Markovic ............... G10L 25/21
10,225,654 B1 * 3/2019 Lindemann ............ H04R 3/007
11,109,155 B2 * 8/2021 Lindemann .............. H04R 3/04
11,330,369 B2 * 5/2022 Stoerger .................... H04R 3/02
2008/0103763 A1 * 5/2008 Shimura .................. H04R 3/04 704/200.1
2013/0163784 A1 * 6/2013 Tracey ..................... H04R 3/04 381/103
2014/0037108 A1 * 2/2014 Christoph .............. H03G 9/025 381/107
2014/0064507 A1 * 3/2014 Su .......................... H03G 9/025 381/71.1
2015/0010168 A1 * 1/2015 Cheng .................... H04R 3/007 381/107

(Continued)

*Primary Examiner* — Gerald Gauthier
(74) *Attorney, Agent, or Firm* — Jackson Walker L.L.P.

(57) ABSTRACT

A method for reducing perceived audio distortion in a loudspeaker in response to an input audio signal may include attenuating the input audio signal within an attenuation frequency band of the input audio signal to generate a limited audio signal, generating masking audio to psycho-acoustically mask absence of audio content attenuated from the attenuation frequency band of the input audio signal, and combining the limited audio signal and the masking audio to generate an output audio signal.

16 Claims, 9 Drawing Sheets

(56) References Cited

U.S. PATENT DOCUMENTS

| | | | | |
|---|---|---|---|---|
| 2015/0222990 | A1* | 8/2015 | Hansen | H03G 5/005<br>381/103 |
| 2016/0149550 | A1* | 5/2016 | Zhu | H03G 5/165<br>381/103 |
| 2017/0133029 | A1* | 5/2017 | Markovic | G10L 19/12 |
| 2017/0274215 | A1* | 9/2017 | Smith | A61N 1/3904 |
| 2018/0176682 | A1* | 6/2018 | Goesnar | G10L 21/0364 |
| 2018/0357996 | A1* | 12/2018 | Fink | G10K 11/17853 |
| 2019/0028789 | A1* | 1/2019 | Stockton, X | H04R 1/1058 |
| 2019/0028828 | A1* | 1/2019 | Lim | H04R 3/04 |
| 2020/0007982 | A1* | 1/2020 | Hosoya | H04R 3/04 |
| 2020/0204902 | A1* | 6/2020 | Bao | H04R 3/02 |
| 2020/0382859 | A1* | 12/2020 | Woodruff | H03G 3/3005 |
| 2020/0396552 | A1* | 12/2020 | Dickinson | H04R 25/604 |
| 2021/0092531 | A1* | 3/2021 | De Haan | H04R 25/505 |
| 2021/0204081 | A1* | 7/2021 | French | H04R 3/007 |
| 2021/0243525 | A1* | 8/2021 | Reuter | G10L 21/0232 |
| 2021/0250691 | A1* | 8/2021 | Grimanis | H04R 3/02 |
| 2022/0054936 | A1* | 2/2022 | Salik | A63F 13/52 |
| 2022/0132245 | A1* | 4/2022 | Klimanis | H04R 3/005 |
| 2022/0369030 | A1* | 11/2022 | Souden | H04R 5/04 |
| 2023/0037824 | A1* | 2/2023 | Jancovich | G10L 21/0232 |
| 2024/0187787 | A1* | 6/2024 | Rumelt | H04R 3/04 |

* cited by examiner

SYSTEMS AND METHODS FOR MINIMIZING SPEAKER DISTORTION

RELATED APPLICATIONS

The present disclosure is related to U.S. Pat. No. 10,225,654, which is incorporated herein by reference in its entirety. In addition, the present disclosure claims priority to U.S. Provisional Pat. Appl. No. 63/430,407, filed Dec. 6, 2022, which is incorporated herein by reference in its entirety.

FIELD OF DISCLOSURE

The instant disclosure relates to audio processing. More specifically, portions of this disclosure relate to audio processing to compensate for speaker distortion.

BACKGROUND

Speakers are not capable of perfectly replicating sounds encoded in audio files. Trade-offs are made during speaker design and manufacturing to fit particular applications. For example, cost constraints may result in selection of materials for speakers that are not ideal. As another example, space constraints may result in construction of a speaker with a size that is not ideal for reproduction of all frequencies of sounds. Smaller speakers, such as those used in mobile phones, are generally less accurate with reproduction of sounds and can introduce distortion into the reproduced sounds. Furthermore, manufacturing imperfections in smaller speakers can introduce additional distortion into the reproduced sounds.

An example of distortion is mechanical rattle. Laptop/notebook computers, smart phones, and other devices with speakers often have a mechanical rattle when audio content with sufficient energy is present within middle frequencies. Such rattle may be perceivable to a listener when high-frequency audio content is also not present to mask the broadband rattle noise. Existing solutions to limit the volume of audio within middle frequencies that cause rattle may not be desirable as such solutions may cause noticeable loss of sound pressure level.

SUMMARY

In accordance with the teachings of the present disclosure, certain disadvantages and problems associated with existing approaches to minimizing distortion, including mechanical rattle, may be reduced or eliminated.

In accordance with embodiments of the present disclosure, a method for reducing perceived audio distortion in a loudspeaker in response to an input audio signal may include attenuating the input audio signal within an attenuation frequency band of the input audio signal to generate a limited audio signal, generating masking audio to psychoacoustically mask absence of audio content attenuated from the attenuation frequency band of the input audio signal, and combining the limited audio signal and the masking audio to generate an output audio signal.

In accordance with these and other embodiments of the present disclosure, an apparatus may include an audio controller configured to perform steps for reducing perceived audio distortion in a loudspeaker in response to an input audio signal comprising: attenuating the input audio signal within an attenuation frequency band of the input audio signal to generate a limited audio signal, generating masking audio to psychoacoustically mask absence of audio content attenuated from the attenuation frequency band of the input audio signal, and combining the limited audio signal and the masking audio to generate an output audio signal.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

In accordance with embodiments of this disclosure, a spectral tilt of an audio signal may be used to determine whether a speaker will introduce perceptible distortion during playback of the audio signal. The spectral tilt may be indicated by determining a ratio between energy in a distortion-producing frequency band and energy in a distortion-masking frequency band. Based on the determined spectral tilt, the distortion-producing frequency band may be attenuated to minimize the distortion introduced by the speaker.

Additionally, the distortion-masking frequency band may be amplified and/or augmented with generated harmonics to minimize perceptibility of the distortion produced by the speaker, and to partially offset the loss in sound pressure level incurred when attenuating the distortion producing frequency band. Harmonics generation may also mitigate the issue of nonexistent masking content by creating distortion masking content from lower frequency, distortion-producing content. Furthermore, harmonics generation may strengthen the perceived volume of the fundamental tones used to generate the harmonics. Preferably, harmonics generation may only occur when distortion-producing content is strong enough to trigger attenuation.

Figure 1:
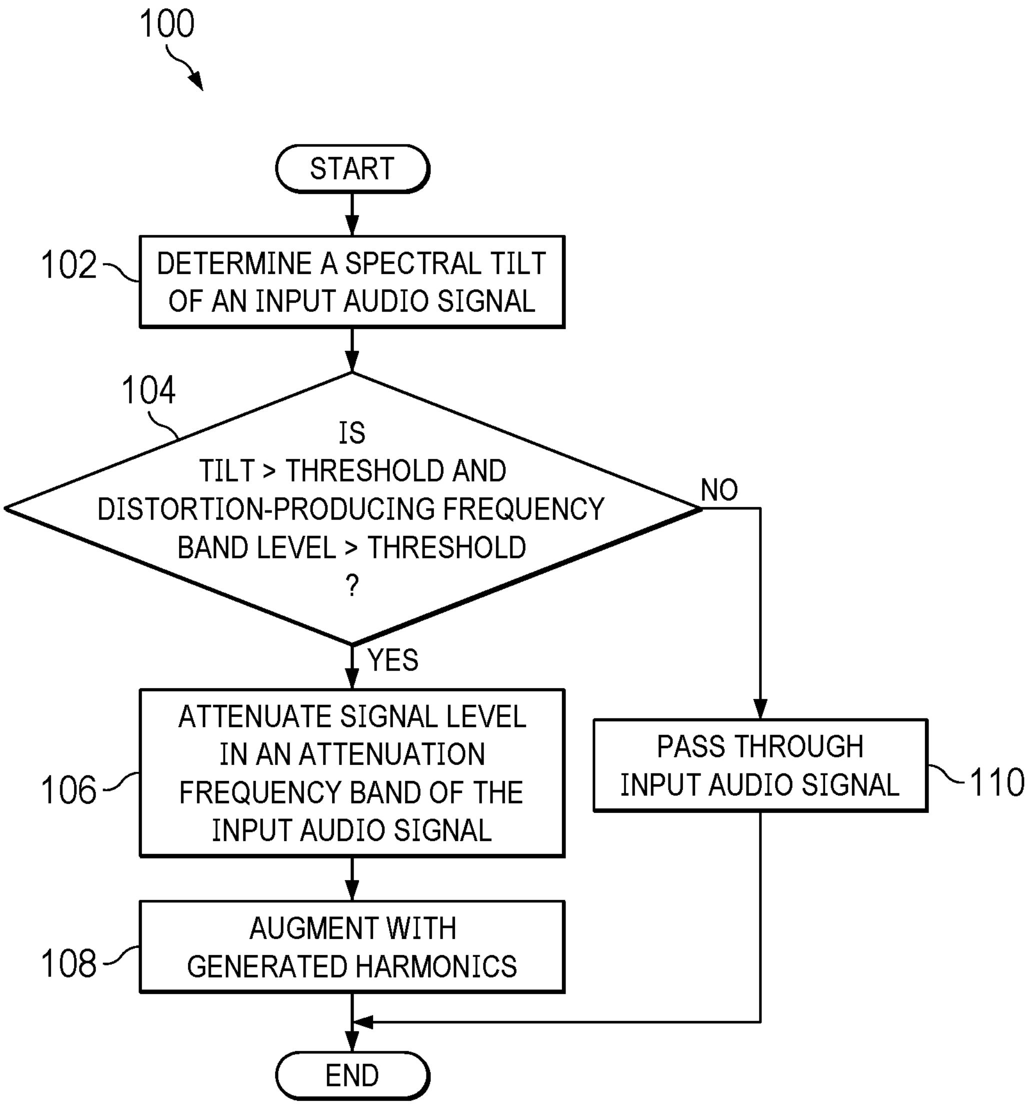
FIG. 1 illustrates a flow chart of an example method for processing an input audio signal to minimize audible distortion using harmonics generation, in accordance with embodiments of the present disclosure.

FIG. 1 illustrates a flow chart of an example method 100 for processing an input audio signal to minimize audible distortion using harmonics generation, in accordance with embodiments of the present disclosure. Method 100 may begin at step 102, with determining a spectral tilt value for an input audio signal. The spectral tilt of the input audio signal may be representative of a ratio between a signal level of a distortion-masking frequency band of the input audio signal to a signal level of a distortion-producing frequency band of the input audio signal. One method of computing a spectral tilt value may be to compute the ratio of a first signal level of the distortion-masking frequency band to a second signal level of the distortion-producing frequency band. For example, a ratio of the second signal level to the first signal level may be determined. Another method of computing a spectral tilt value is to compute the ratio of a first signal level indicative of the signal level in the entire audio signal or in an audible subset of the audio signal with a second signal level of the distortion-producing frequency band. Yet another method of computing a spectral tilt value is to fit a line to a distribution of energy across audible frequencies and use the slope of that line as the spectral tilt value. Many methods for computing spectral tilt estimates are known to those skilled in the art of audio signal processing.

The spectral tilt value may be used, in conjunction with the input audio signal level, or the level of the input signal in the distortion producing frequency band of the input audio signal, to determine whether to apply attenuation to the input audio signal to minimize audible distortion resulting from reproduction of the input audio signal. At step 104, the spectral tilt value may be compared to a threshold value and the energy level of a distortion-producing frequency band compared to a threshold value to determine whether perceptible audio distortion is not sufficiently masked. If both are larger than the threshold value, then method 100 may continue to step 106. Otherwise, method 100 may proceed to step 110.

At step 106, an attenuation frequency band of the input audio signal may be attenuated to create a modified audio signal for driving a speaker. At step 108, the input audio signal may be augmented with generated harmonics in order to generate the modified audio signal in order to minimize perceptibility of the distortion produced by the speaker, and to partially offset the loss in sound pressure level incurred when attenuating the distortion producing frequency band. After completion of step 108, method 100 may end.

At step 110, the input audio signal may be passed through to drive the speaker with little or no modification. After completion of step 110, method 100 may end.

Figure 2A:
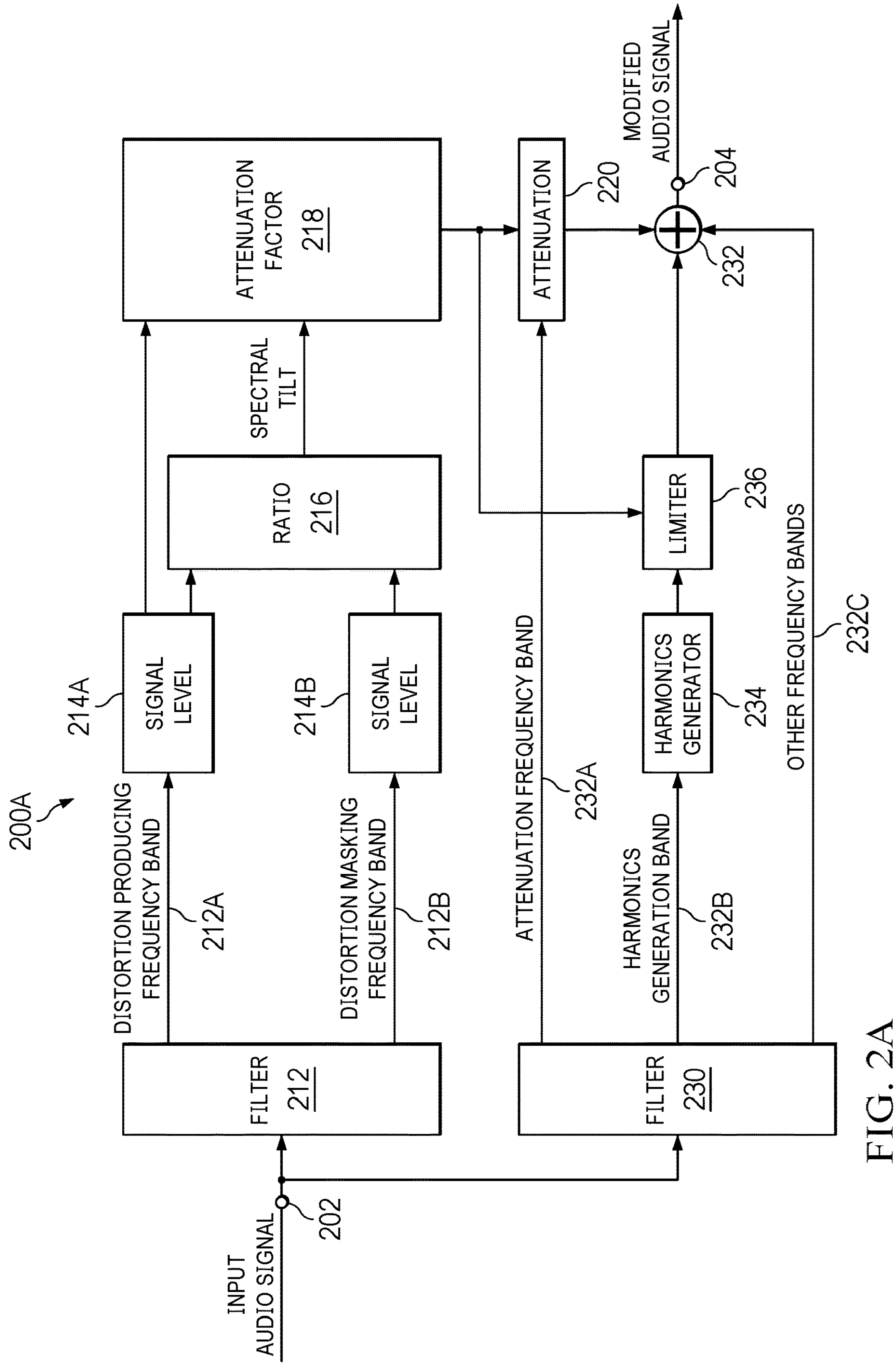
FIG. 2A illustrates a block diagram of selected components of an example integrated circuit for processing an input audio signal to minimize distortion, in accordance with embodiments of the present disclosure.

A block diagram for an example integrated circuit for implementing method 100 is shown in FIG. 2A. FIG. 2A illustrates a block diagram of selected components of an example integrated circuit (IC) 200A for processing an input audio signal to minimize distortion, in accordance with embodiments of the present disclosure. A person of ordinary skill in the art may implement the block diagram of FIG. 2A in an integrated circuit, such as by programming a digital signal processor (DSP) or a central processing unit (CPU) or designing an application-specific integrated circuit (ASIC), to perform the functions described with reference to FIG. 2A. IC 200A may receive an input audio signal at input node 202. The input audio signal may be filtered at filter block 212 to produce separate audio signals for distortion-producing frequency band 212A and distortion-masking frequency band 212B. Signal levels of the bands 212A and 212B may be determined by signal level blocks 214A and 214B. A ratio of the signal levels output from blocks 214A and 214B may be computed at ratio block 216. Such ratio may be a value representative of the spectral tilt of the input audio signal. The spectral tilt value and the signal level of the distortion-producing frequency band output from ratio block 216 may be used by attenuation factor block 218 to determine an amount to attenuate a signal level of portions of the input audio signal and/or limit application of harmonics to the input audio signal.

The attenuation may be applied to all or part of the input audio signal to produce a modified audio signal for output at output node 204. A filter 230 may receive the input audio signal from input node 202 and may produce an audio signal 232A within an attenuation frequency band, an audio signal 232B within a harmonics generation band, and an audio signal 232C within other frequency bands. An attenuation block 220 may apply the determined attenuation from attenuation factor block 218 to audio signal 232A within the attenuation frequency band.

In addition or alternatively, a harmonics generator 234 may create harmonics from audio signal 232B within the harmonics generation band, wherein the harmonics generation band may be at frequencies higher than the attenuation band that may cause little or no rattle or other distortion. A user may psychoacoustically perceive that distortion-producing audio above the threshold is actually present (e.g., by the use of beat frequencies), even though such audio is not present. A dynamic range limiter 236 may apply a gain to the generated harmonics as a function of the attenuation from attenuation factor block 218 (e.g., in some embodiments the gain applied to harmonics generated by harmonics generator 234 may be inversely proportional to the attenuation applied by attenuation block 220). The presence of this additional high-frequency content may also mask rattle and/or other distortion.

Combiner 232 may combines the output of attenuation factor block 218 and the output of dynamic range limiter 236 with the audio signal 232C within the other frequency bands to produce a modified audio signal at output node 204. The modified audio signal may produce less audible distortion when played back through a speaker, mask audio content in the distortion-producing frequency band, and/or psychoacoustically replace attenuated audio with virtual audio via harmonics.

The frequency bands may be selected based on characteristics of the speaker reproducing the audio signal. The distortion-producing frequency band may be selected to align with frequency bands in which rattle or other distortion are naturally at high levels in a particular speaker. For example, for some speakers, rattle may exist between 2500 HZ and 8000 Hz. The distortion-masking frequency band may include sounds that when played have a psychoacoustic effect of covering the distortion from perception by a listener. In some embodiments, the distortion-producing frequency band may be the entire audible spectrum and the distortion-masking frequency band may be a subset of the audible spectrum.

Attenuation may be used to minimize the signal level of sounds in an attenuation frequency band in order to minimize distortion in the distortion-masking frequency band. For example, attenuation may be applied when the measured signal level in the distortion-producing frequency band of the input audio signal is high enough to generate noticeable distortion products in the distortion-masking frequency band, and the measured signal level in said distortion-masking frequency band of the input audio signal is insufficient to substantially mask said distortion products. The attenuation frequency band may be selected such that a distortion introduced by the speaker is minimized proportionally when the signal level in the frequency band is minimized. In some embodiments, the attenuation frequency band may overlap with the distortion-producing frequency band such that some or all of the energy in the distortion-producing frequency band is minimized.

Harmonics may be used to psychoacoustically replace attenuated audio from the attenuation band and/or mask distortion present in the distortion-producing frequency band. For example, harmonics may be applied when the measured signal level in the distortion-producing frequency band of the input audio signal is high enough to generate noticeable distortion products in the distortion-masking frequency band, and the measured signal level in said distortion-masking frequency band of the input audio signal is insufficient to substantially mask said distortion products. The harmonics generation band may be selected such that harmonics generated from audio signal 232B may psychoacoustically replace attenuated audio from the perception of a human listener and/or are at such levels capable of masking distortion that occurs. In some embodiments, the harmonics generation band may overlap with one or more of the distortion-producing frequency band, the distortion generating band, the attenuation band, and the unmodified band of audio signal 232C.

Figure 2B:
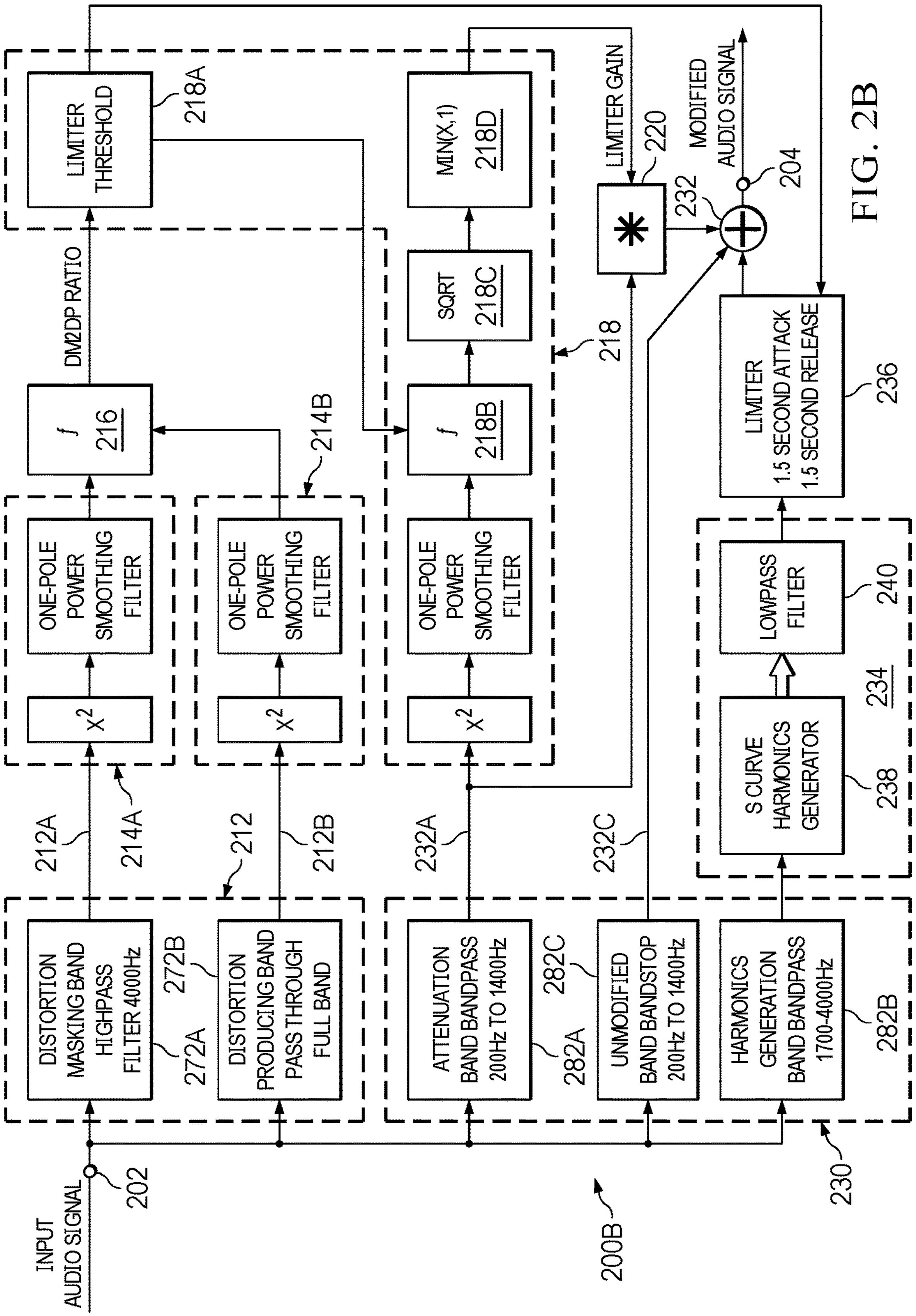
FIG. 2B illustrates a block diagram of selected components of another example integrated circuit for processing an input audio signal to minimize distortion, in accordance with embodiments of the present disclosure.

FIG. 2B illustrates a block diagram of selected components of another example IC 200B for processing an input audio signal to minimize distortion, in accordance with embodiments of the present disclosure. As shown in FIG. 2B, high-pass filter 272A may isolate the frequency band above 4000 Hz, which is the distortion-masking frequency band for this embodiment. Block 272B may pass through the entire input signal because the entire frequency band may be the distortion-producing frequency band in embodiments represented by FIG. 2B. Bandpass filter 282A may pass the frequency band from 200 Hz to 1400 Hz, which is the attenuation frequency band for this embodiment. Bandpass filter 282B may pass the frequency band from 1700 Hz to 4000 Hz, which may be the harmonics generation band. Bandstop filter 282C may pass all parts of the audio signal that are not part of the attenuation band. The signal power levels of the distortion-masking frequency band, the distortion-producing frequency band, and the attenuation-frequency band may be calculated by computing the squared signal values in x^2 blocks of 214A, 214B, and 218. These squared signal values may be smoothed using the one-pole filters of the same blocks to produce smoothed power estimates of the three frequency band signals. A distortion-masking-to-distortion-producing power ratio (DM2DP ratio) may be computed by dividing the distortion-masking frequency band power by the distortion-producing frequency band power in block 218B. The DM2DP power ratio may be scaled and offset inside limiter threshold block 218A to produce a limiter threshold. In block 218B, the limiter threshold may be divided by the smoothed power level of the attenuation frequency band. The square root operation of block 218C may convert this ratio into a potential limiter gain value. The output of block 218C may be greater than 1 if the limiter threshold is greater than the smoothed power level of the attenuation band signal output from 212A. In this case, rather than amplify the signal, the signal may pass unchanged. Thus, in block 218D, the gain is the limited maximum of 1. If the output of block 218C is less than 1, then the output may pass through block 218D unchanged; if it is greater than or equal to 1, then it is set to 1 by block 218D. When the signal level of the attenuation frequency band is greater than the limiter threshold, the limiter gain output from block 218D may be less than 1, otherwise the limiter gain may be exactly 1. In block 220, the attenuation band signal may be multiplied by the limiter gain. The result is that when the attenuation band signal is above the limiter threshold, it is attenuated; otherwise it passes unchanged through block 220 due to the multiply-by-one.

Harmonics generator 234 may be implemented by an "S" curve harmonics generator 238 followed by a lowpass filter 240. An example of an equation for S-curve harmonics generator 238, assuming the input audio signal ranges from a value of −1.0 to +1.0, may be given by:

$$y = \frac{9x}{1 + 8|x|}$$

where x represents the input signal to S-curve harmonics generator 238 and y represents the output.

In some embodiments, lowpass filter 240 may have a cutoff frequency of approximately 4000 Hz. In the embodiments represented by FIG. 2B, dynamic range limiter 236 may be controlled by the limiter threshold, such that the level of harmonics generated by dynamic range limiter 236 is inversely related to the limiter threshold, in accordance with an attack-and-release procedure. For example, when limiter threshold block 218A engages and suppresses the distortion-producing frequency band (e.g., by applying a threshold of −40 decibels relative to full-scale (dBFS)), the threshold of dynamic range limiter 236 may increase towards 0 dBFS to allow the generated harmonics to be heard. Likewise, when limiter threshold block 218A disengages and ceases to suppress the distortion inducing band (e.g., by applying a threshold of 0 dBFS), the threshold of dynamic range limiter 236 may decrease towards −∞ dBFS (or a low practically realizable amount, such as −99 dBFS) to disallow the generated harmonics from being heard.

The newly-limited attenuation band and newly-limited harmonics may then be added to the output of the band-stop filter of 282C. The output of filter 282C may represent all of the signal that is not part of the attenuation band, which may pass through the system unmodified. The output of the adder block 232 may be the modified audio output of the system, which includes the limited attenuation band and limited harmonics. Although certain computations and frequency ranges are illustrated in the embodiment of FIG. 2B, other embodiments may perform different calculations and different frequency ranges for attenuating a portion of the input audio signal to reduce speaker distortion.

Spectral tilt may be evaluated using various metrics. For example, one example of spectral tilt value may be determined in the integrated circuits of FIG. 2A and FIG. 2B. That spectral tilt value may be a ratio of a first signal level of a distortion-masking frequency band to a second signal level of a distortion-producing frequency band, referred to as a DM2DP ratio. A method for modifying an audio signal using this ratio is shown in FIG. 3.

Figure 3:
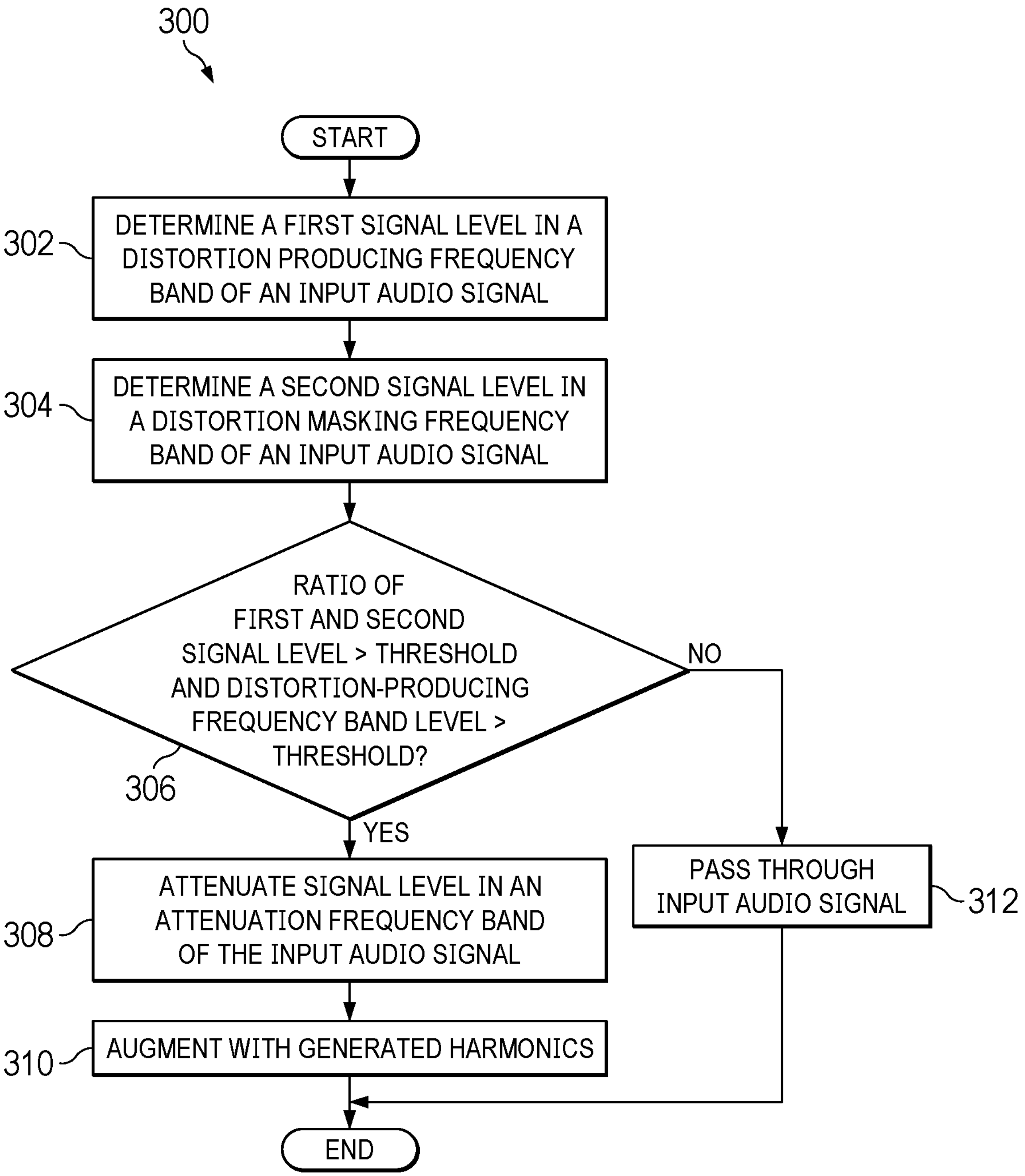
FIG. 3 illustrates a flow chart of another example method of processing an input audio signal to minimize distortion using harmonics generation, in accordance with embodiments of the present disclosure.

FIG. 3 illustrates a flow chart of another example method 300 of processing an input audio signal to minimize distortion using harmonics generation, in accordance with embodiments of the present disclosure. Method 300 may begin at step 302 with determining a first signal level in a distortion-producing frequency band of an input audio signal. At step 304, a second signal level may be determined for a distortion-masking frequency band of the input audio signal. At step 306, a ratio of the first and second signal levels is compared with a threshold level and a level of the distortion-producing frequency band is compared with a threshold level. If both are higher than their respective thresholds, then method 300 may proceed to step 308. Otherwise, method 300 may proceed to step 312.

At step 308, a signal level in an attenuation frequency band of the input audio signal may be attenuated. At step 310, the input audio signal may be augmented with generated harmonics in order to generate the modified audio signal in order to minimize perceptibility of the distortion produced by the speaker, and to partially offset the loss in sound pressure level incurred when attenuating the distortion producing frequency band. After completion of step 310, method 300 may end.

At step 312, the input audio signal may be passed through to drive the speaker with little or no modification. After completion of step 312, method 300 may end.

Another example of spectral tilt value may be based on a percentage of audio energy in a high-frequency band as a percentage of all audio energy in the input audio signal. This ratio may be expressed as a ratio of a first signal level of a subset of frequencies of the input audio signal and a second signal level of the entire input audio signal. The subset of frequencies may be higher in frequency than the distortion-producing frequency band. The high frequency content selected for determining the ratio may have some effect in masking distortion introduced by the speaker in the distortion-producing frequency bands of the input audio signal. An example integrated circuit for performing attenuation based on this evaluation of spectral tilt is shown in FIG. 4.

Figure 4:
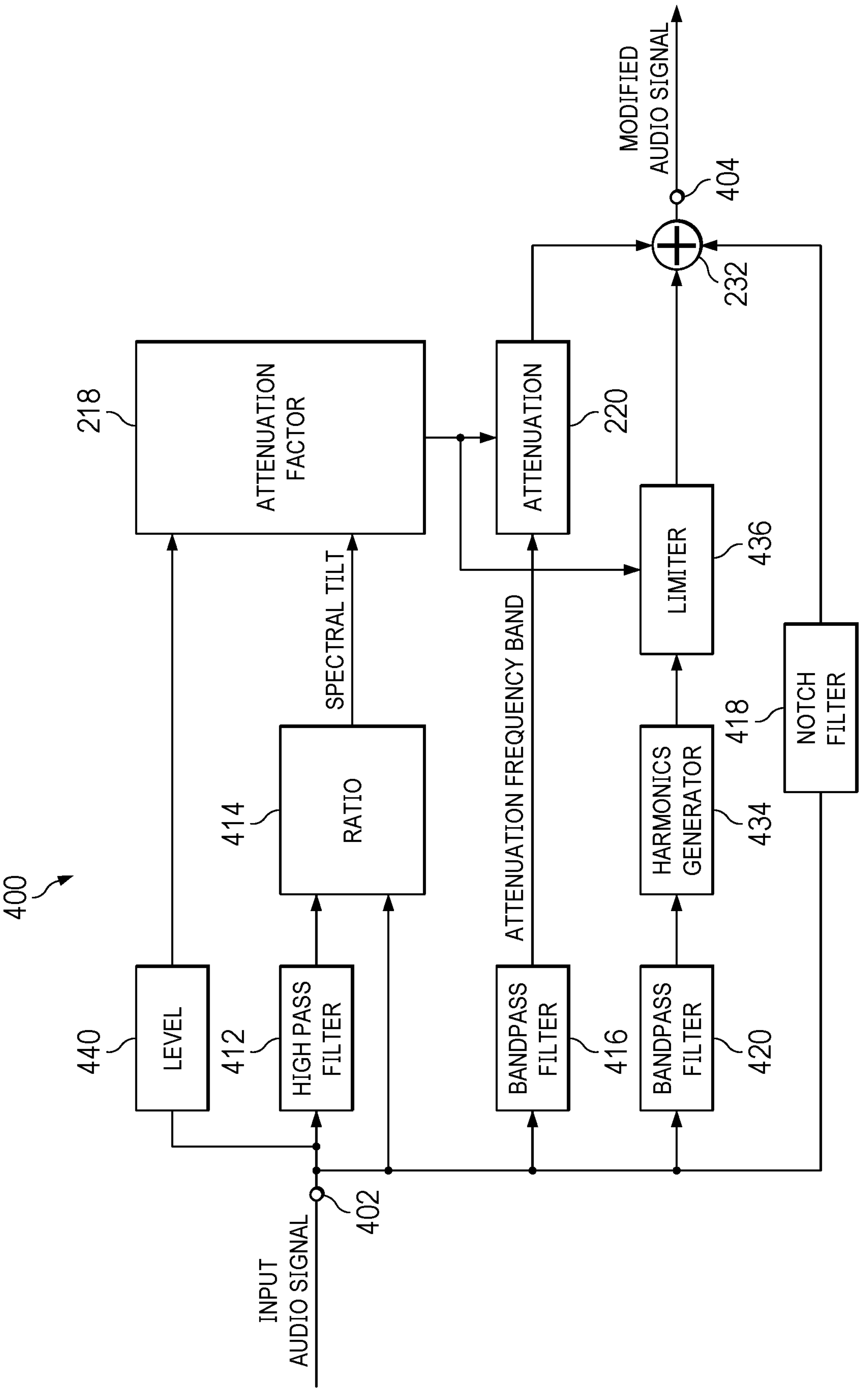
FIG. 4 illustrates a block diagram of selected components of another integrated circuit for processing an input audio signal to minimize distortion, in accordance with embodiments of the present disclosure.

FIG. 4 illustrates a block diagram of selected components of another IC 400 for processing an input audio signal to minimize distortion, in accordance with embodiments of the present disclosure. IC 400 may receive an input audio signal at input node 402. The input signal may be high-pass filtered in filter block 412. The cut-off for the high-pass filter block 412 may be chosen to select high-frequency content that may have some effect in masking distortion introduced by the speaker in the distortion-producing frequency bands of the input audio signal. One example cut-off is 2.5 kilohertz. Ratio block 414 may compare a signal level of the high-pass filtered audio signal with the input audio signal to evaluate a spectral tilt value. The spectral tilt value may be provided to attenuation factor block 218. The attenuation factor block 218 may determine parameters, such as a limiter threshold, for attenuating portions of the input audio signal, based on a spectral tilt and an energy level of the distortion-producing frequency band received from block 440 (which, in the embodiments represented by FIG. 4, may be an energy level of the full band of the input audio signal).

The input audio signal may be processed with filters and attenuators to attenuate signal in the attenuation frequency band. The input audio signal may be filtered by bandpass filter 416 to select the attenuation frequency band from the input audio signal. The output of bandpass filter 416 may be modified by attenuation block 220 based on the output from attenuation factor block 218.

Further, the input audio signal may be filtered by bandpass filter 420 to select the harmonics generation band from the input audio signal, wherein the harmonics generation band may be at frequencies higher than the attenuation band that may cause little or no rattle or other distortion. Harmonics generator 434 may create harmonics from the audio signal generated by bandpass filter 420 within the harmonics generation band. A user may psychoacoustically perceive that distortion-producing audio above the threshold is actually present (e.g., by the use of beat frequencies), even though such audio is not present. A limiter 436 may apply a gain to the generated harmonics as a function of the attenuation from attenuation factor block 218 (e.g., in some embodiments the gain applied to harmonics generated by harmonics generator 434 may be inversely proportional to the attenuation applied by attenuation block 220). The presence of this additional high-frequency content may also mask rattle and/or other distortion.

A notch filter 418 may pass un-modified audio content around the attenuation frequency band to the combiner 232. The combiner 232 may recombine the un-modified audio content with an attenuated version of the attenuation frequency band and the generated harmonics. The output of the combiner 232 may be a modified audio signal at output node 404.

Figure 5:
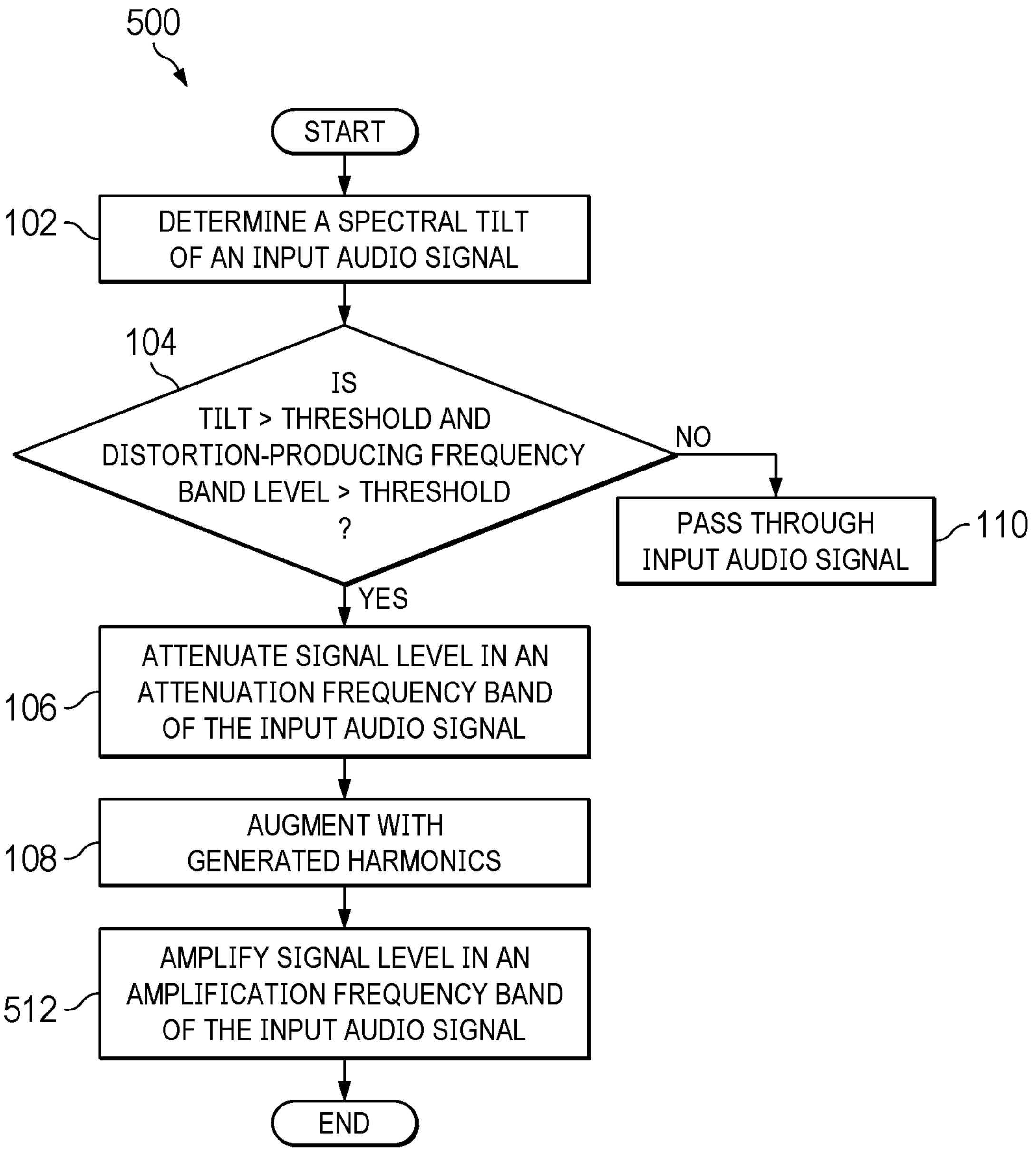
FIG. 5 illustrates a flow chart of an example method of processing an input audio signal to minimize distortion using attenuation, amplification and harmonics generation, in accordance with embodiments of the present disclosure.

The example embodiments of FIGS. 1, 2A, 2B, 3, and 4, may use attenuation of selected frequencies to reduce perceived distortion in reproduced sounds and augmentation with generated harmonics to psychoacoustically replace the attenuated content. Amplification of selected frequencies may also be used to reduce perceived distortion in reproduced sounds. For example, FIG. 5 illustrates a flow chart of an example method 500 of processing an input audio signal to minimize distortion using attenuation, amplification, and harmonics generation, in accordance with embodiments of the present disclosure. Method 500 may be similar to method 100 of FIG. 1. If conditions at block 104 are satisfied, then an attenuation frequency band is attenuated at block 106. When the spectral tilt is greater than the threshold level indicating that audio distortion will be perceptible and is not sufficiently masked, an amplification frequency band may be amplified at block 512 in addition or in the alternative to the attenuation at block 106. The amplification frequency band may be selected to overlap the distortion-masking frequency band, such that amplification of the amplification frequency band further masks the distortion introduced by the speaker.

Figure 6:
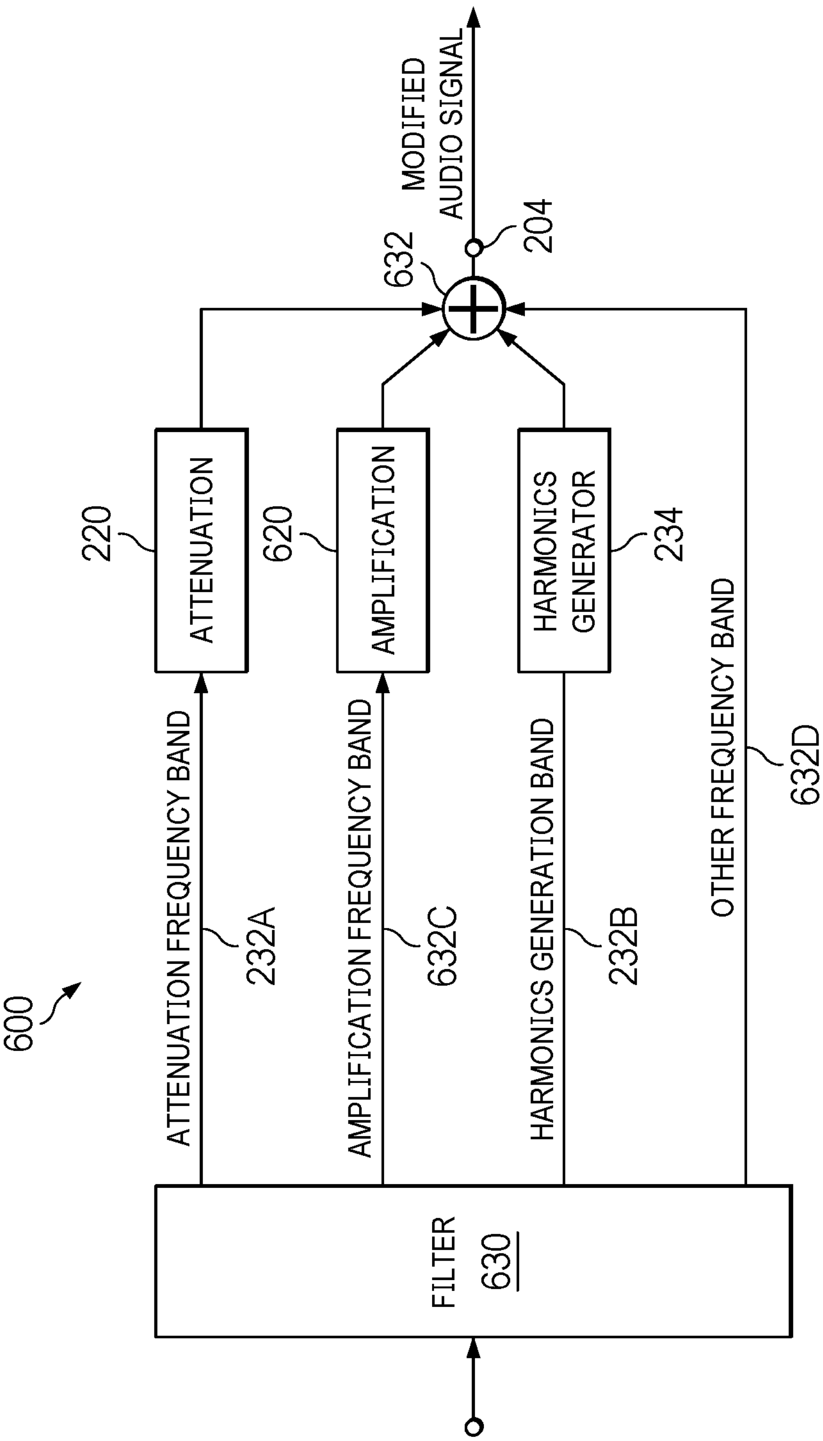
FIG. 6 illustrates a block diagram of selected components of an example integrated circuit for processing an input audio signal to minimize distortion using attenuation and amplification, in accordance with embodiments of the present disclosure.

FIG. 6 illustrates a block diagram of selected components of example IC 600 for processing an input audio signal to minimize distortion using attenuation and amplification, in accordance with embodiments of the present disclosure. IC 600 may be similar to ICs 200A and 200B of FIGS. 2A and 2B. FIG. 6 depicts a spectral tilt value based on signal levels of the distortion-producing frequency band and the distortion-masking frequency band. A combination of attenuation and amplification may also be used to modify audio signals when other measures of spectral tilt are used, such as the ratio used in the embodiments of FIGS. 4 and 5.

Referring back to FIG. 6, the modification of the input audio signal may begin at filter 630. Filter 630 may filter the input audio signal into an attenuation frequency band 232A, a harmonics generation band 232B, an amplification frequency band 632C, and other frequency bands 632D. Attenuation block 220 may operate on attenuation frequency band 232A to reduce a signal level in at least a portion of attenuation frequency band 232A. Harmonics generator 234 may operate on harmonics generation band 232B to generate harmonics in order to psychoacoustically replace the attenuated content of attenuation frequency band 232A. Harmonics generator 234 may be controlled by attenuation factor block 218 based on the same parameters used to control attenuation block 220. An amplification block 620 may operate on the amplification frequency band 632C to increase a signal level in at least a portion of the frequency band 632D, in order to further mask distortion. Amplification block 620 may be controlled by attenuation factor block 218 based on the same parameters used to control attenuation block 220. The output of attenuation block 220, harmonics generator 234, and amplification block 620 may be joined with the other frequency bands 632D by combiner 633 to form a modified audio signal for output at output node 204. Attenuation block 220, harmonics generator 234, and/or amplification block 620 may be separately enabled and disabled based on measured spectral tilt, signal level in a high-frequency band, signal level in a distortion-producing frequency band, signal level in a distortion-masking frequency band, and/or other parameters.

Figure 7:
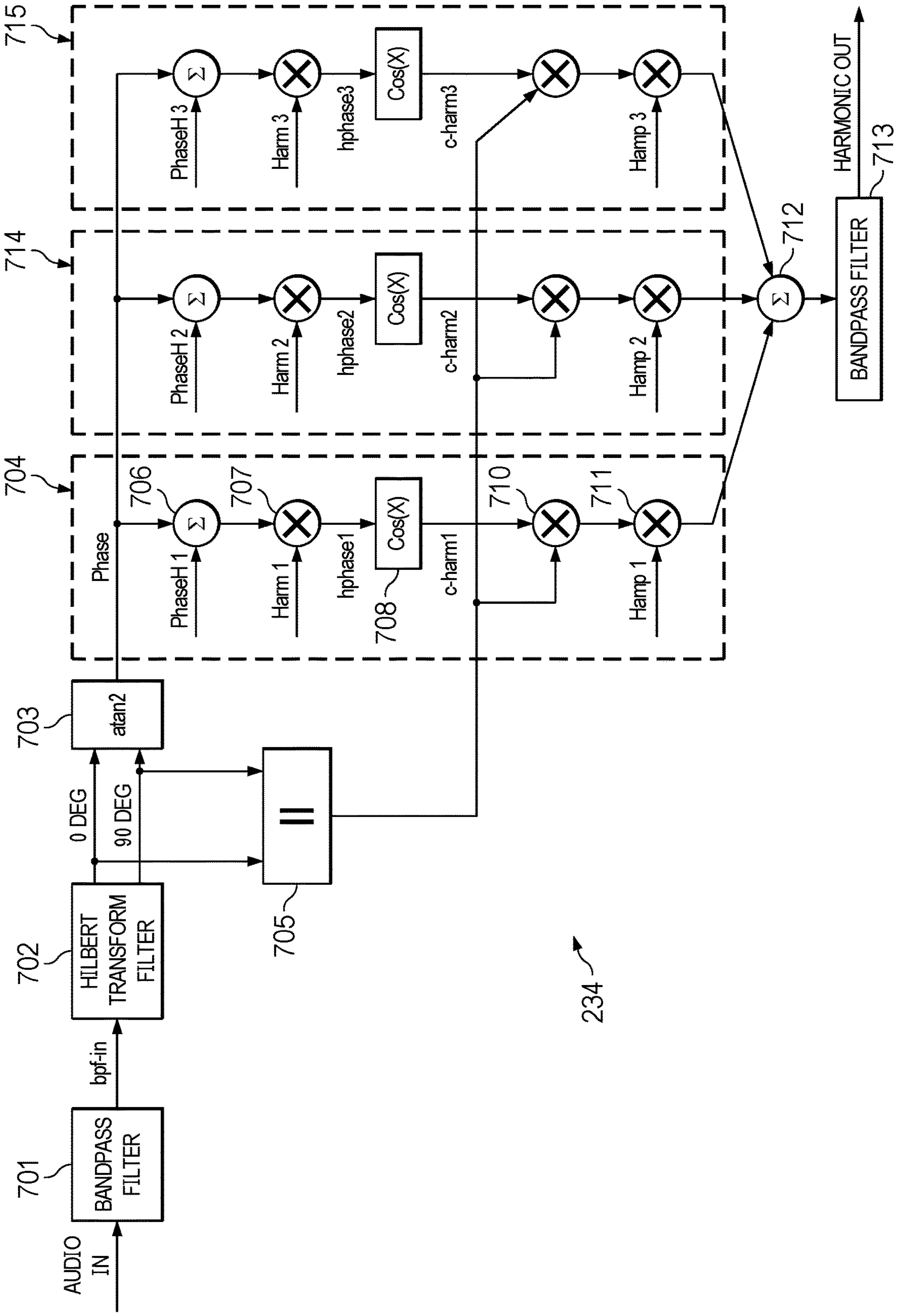
FIG. 7 illustrates a block diagram of selected components of an example harmonics generator, in accordance with embodiments of the present disclosure.

The example embodiments of FIGS. 1, 2A, 2B, 3, 4, 5, and 6 may use augmentation with generated harmonics to psychoacoustically attenuate content. FIG. 7 illustrates an example system for generating harmonics. FIG. 7 illustrates a block diagram of selected components of an example harmonics generator 234, in accordance with embodiments of the present disclosure.

As shown in FIG. 7, harmonics generator 234 may receive an audio signal AUDIO IN as an input signal to bandpass filter 701, which may enhance the spectral portion that contributes to rattle and generate a filter output signal BPF-IN. A Hilbert transform 702 may transform filter output signal BPF-IN to an analytic signal with both in-phase (0 degrees) and quadrature (90 degrees) components. The output of Hilbert transform 702 may be input to inverse tangent block 703 to isolate the phase of filter output signal BPF-IN. Harmonics generator 234 may then process this phase signal to obtain harmonics with easily configurable characteristics.

As shown in FIG. 7, the phase output from inverse tangent block 703 may be processed to produce harmonic images with varying characteristics. A processing branch may be instantiated for each desired harmonic with the phase input to each branch. Although any suitable number of branches may be used, the example harmonics generator 234 of FIG. 7 depicts three branches 704, 714, and 715 for purposes of clarity and exposition. Branches 704, 714, and 715 may perform processing in the same or similar manner, but only the processing of branch 704 is discussed herein, for purposes of exposition.

The phase signal from inverse tangent block 703 may be offset by adding a desired offset PHASEH 1 by summer block 706. The output of summer block 706 may then be scaled in multiplier block 707 by a desired real number HARM1 (e.g., a positive integer) to produce a harmonic phase signal HPHASE1. Harmonic phase signal HPHASE1 may be converted into an audio harmonic signal by taking a cosine of the harmonic phase signal by cosine block 708, to generate cosine signal C-HARM1.

Multiplier block 710 may multiply cosine signal C-HARM1 by a signal magnitude generated by absolute value block 705. Absolute value block 705 may create the signal magnitude from the in-phase and quadrature outputs from block 702, squaring each input, adding the squares, and taking a square root of the resulting sum. Multiplier block 711 may further multiply the output of multiplier block 710 by a desired scaling factor HAMP1, scaling the magnitude for that branch (i.e., harmonic).

A summing block 712 may add the results of the branches 704, 714, and 715 together, and a bandpass filter 713 may further filter the resulting signal to generate a harmonic signal.

A variation on the embodiments represented by FIG. 7 may be to create additional processing of input signal AUDIO IN by applying a second bandpass filter with the resulting output processed by the second Hilbert transform filter.

A second variation may be created by adding additional instantiations of bandpass filter 701 and Hilbert transform filter 702. The additional bandpass filter may be set to pass the harmonic band (unlike the rattle band of 701). The additional bandpass filter output may be input to the additional Hilbert transform filter 702. The outputs of the additional Hilbert transform filter may then be input to absolute value block 705 in lieu of the input of absolute value block 705 inputs. By selecting the pass band of the second bandpass filter, for example, to be the band of the generated harmonics, the envelope of the original harmonics may be placed on the generated harmonic output to create an alternative harmonic generator.

Figure 8:
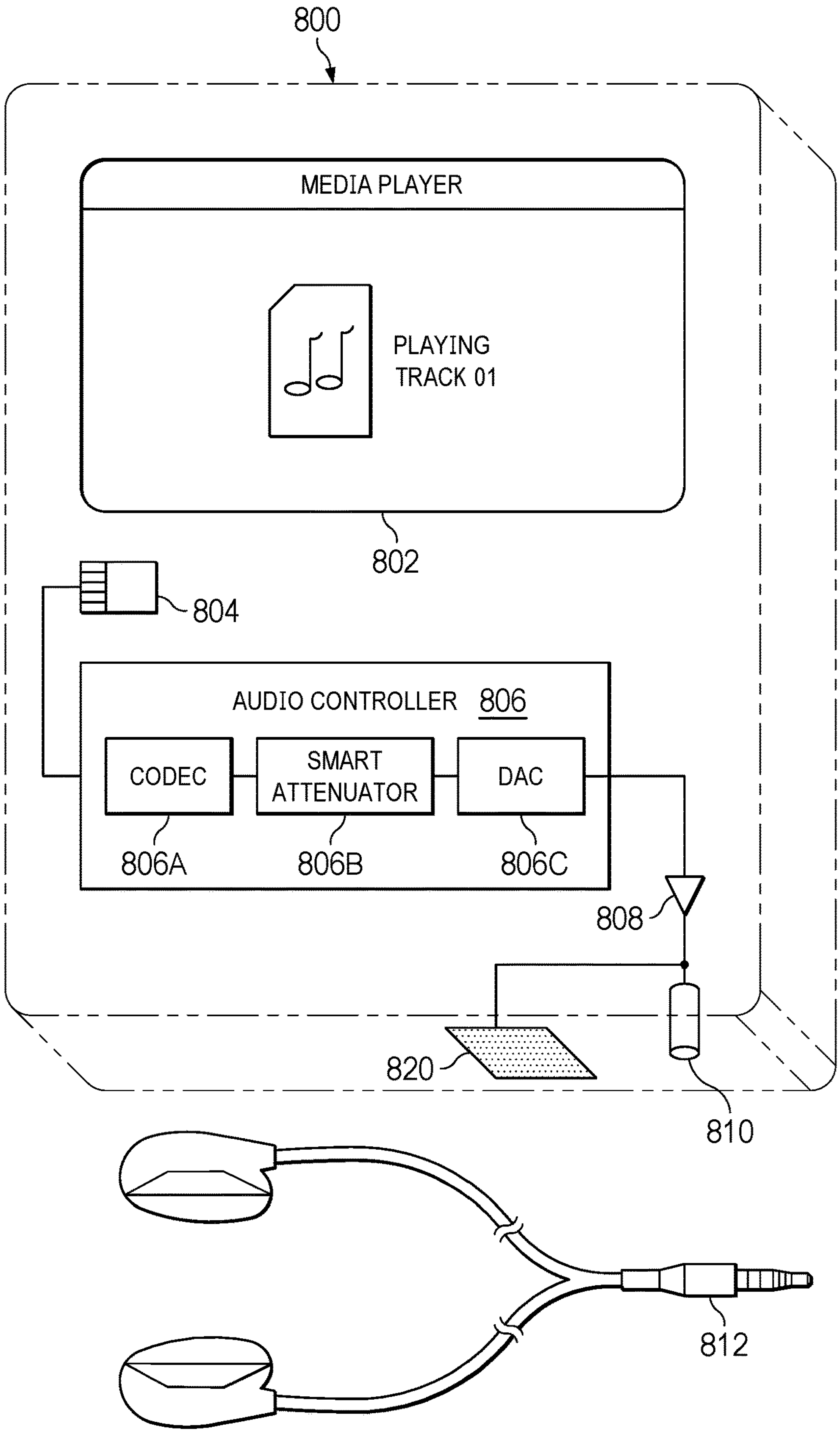
FIG. 8 illustrates a block diagram of selected components of an example personal media device for audio playback including an audio controller that is configured to minimize distortion, in accordance with embodiments of the present disclosure.

The methods and systems described herein may be used in any suitable system, device, or apparatus. An example of such use may be in a personal media device for playing back music, high-fidelity music, and/or speech from telephone calls. FIG. 8 illustrates a block diagram of selected components of an example personal media device 800 for audio playback including an audio controller that is configured to minimize distortion, in accordance with embodiments of the present disclosure. A personal media device 800 may include a display 802 for allowing a user to select from music files for playback, which may include both high-fidelity music files and normal music files. When music files are selected by a user, audio files may be retrieved from memory 804 by an application processor (not shown) and provided to an audio controller 806. The audio controller 806 may include a coder/decoder (CODEC) 806A and audio processing circuitry including smart attenuator 806B and DAC 806C. The smart attenuator 806B may implement audio processing to modify an input audio signal, according to the embodiments depicted in the figures and described herein. The digital audio (e.g., music or speech) may be converted to analog signals by the audio controller 806, and those analog signals amplified by an amplifier 808. Although the smart attenuator 806B is shown operating on the digital signal prior to conversion to an analog signal, the smart attenuator in other embodiments may operate on the analog signal. The amplifier 808 may be coupled to an audio output 810, such as a headphone jack, for driving a transducer, such as headphones 812. The amplifier 808 may also be coupled to an internal speaker 820 of the device 800. When a headphone is connected at audio output 810, the smart attenuator 806B may be disabled because the headphones 812 do not introduce the same distortion as speaker 820. In some embodiments, the smart attenuator 806B is provided an indication of when the headphones 812 are connected at audio output 810 along with an indication of the type of headphones such that the smart attenuator 806B may modify processing to reduce distortions that are specific to the headphones 812. Although the data received at the audio controller 806 is described as received from memory 804, the audio data may also be received from other sources, such as a USB connection, a device connected through Wi-Fi to the personal media device 800, a cellular radio, an Internet-based server, another wireless radio, and/or another wired connection.

The schematic flow chart diagrams of methods 100, 300, and 500 are generally set forth as a logical flow chart diagram. Likewise, other operations for the circuitry are described without flow charts herein as sequences of ordered steps. The depicted order, labeled steps, and described operations are indicative of aspects of methods of the invention. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an IC constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor (e.g., CPU or DSP) capable of executing instructions contained in software. The firmware and/or software may include instructions that cause the processing of signals described herein to be performed. The circuitry or software may be organized as blocks that are configured to perform specific functions. Alternatively, some circuitry or software may be organized as shared blocks that can perform several of the described operations. In some embodiments, the IC that is the controller may include other functionality. For example, the controller IC may include an audio coder/decoder (CODEC) along with circuitry for performing the functions described herein. Such an IC is one example of an audio controller. Other audio functionality may be additionally or alternatively integrated with the IC circuitry described herein to form an audio controller.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks, and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, where general purpose processors are described as implementing certain processing steps, the general purpose processor may be a digital signal processor (DSP), a graphics processing unit (GPU), a central processing unit (CPU), or other configurable logic circuitry. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, “each” refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words “means for” or “step for” are explicitly used in the particular claim.

What is claimed is:

1. A method for reducing perceived audio distortion in a loudspeaker in response to an input audio signal, the method comprising:

attenuating the input audio signal within an attenuation frequency band of the input audio signal to generate a limited audio signal;

generating masking audio, by generating harmonic content, to psychoacoustically mask absence of audio content attenuated from the attenuation frequency band of the input audio signal; and combining the limited audio signal and the masking audio to generate an output audio signal.

2. The method of claim 1, wherein generating harmonic content comprises using Hilbert transform-based harmonic generation.

3. The method of claim 1, wherein generating harmonic content comprises using S-curve-based harmonic generation.

4. The method of claim 1, further comprising determining when distortion-causing audio content is present in the input audio signal, wherein the steps of attenuating the input audio signal within the attenuation frequency band of the input audio signal to generate the limited audio signal and generating masking audio to psychoacoustically mask absence of audio content attenuated from the attenuation frequency band of the input audio signal are performed in response to determining when distortion-causing audio content is present in the input audio signal.

5. The method of claim 4, wherein determining when distortion-causing audio content is present in the input audio signal comprises comparing a first signal level of a distortion-producing frequency band of the input audio signal to a second signal level of a distortion-masking frequency band of the input audio signal.

6. The method of claim 1, further comprising determining when rattle-causing audio content is present in the input audio signal, wherein the steps of attenuating the input audio signal within the attenuation frequency band of the input audio signal to generate the limited audio signal and generating masking audio to psychoacoustically mask absence of audio content attenuated from the attenuation frequency band of the input audio signal are performed in response to determining when rattle-causing audio content is present in the input audio signal.

7. The method of claim 1, wherein generating masking audio comprises generating the masking audio in a masking frequency band outside of the attenuation frequency band.

8. The method of claim 7, wherein the masking frequency band is of higher frequencies than the attenuation frequency band.

9. An apparatus comprising:

an audio controller configured to perform steps for reducing perceived audio distortion in a loudspeaker in response to an input audio signal comprising:

attenuating the input audio signal within an attenuation frequency band of the input audio signal to generate a limited audio signal;

generating masking audio, by generating harmonic content, to psychoacoustically mask absence of audio content attenuated from the attenuation frequency band of the input audio signal; and combining the limited audio signal and the masking audio to generate an output audio signal.

10. The apparatus of claim 9, wherein generating harmonic content comprises using Hilbert transform-based harmonic generation.

11. The apparatus of claim 9, wherein generating harmonic content comprises using S-curve-based harmonic generation.

12. The apparatus of claim 9, further comprising determining when distortion-causing audio content is present in the input audio signal, wherein the steps of attenuating the input audio signal within the attenuation frequency band of the input audio signal to generate the limited audio signal and generating masking audio to psychoacoustically mask absence of audio content attenuated from the attenuation frequency band of the input audio signal are performed in response to determining when distortion-causing audio content is present in the input audio signal.

13. The apparatus of claim 12, wherein determining when distortion-causing audio content is present in the input audio signal comprises comparing a first signal level of a distortion-producing frequency band of the input audio signal to a second signal level of a distortion-masking frequency band of the input audio signal.

14. The apparatus of claim 9, further comprising determining when rattle-causing audio content is present in the input audio signal, wherein the steps of attenuating the input audio signal within the attenuation frequency band of the input audio signal to generate the limited audio signal and generating masking audio to psychoacoustically mask absence of audio content attenuated from the attenuation frequency band of the input audio signal are performed in response to determining when rattle-causing audio content is present in the input audio signal.

15. The apparatus of claim 9, wherein generating masking audio comprises generating the masking audio in a masking frequency band outside of the attenuation frequency band.

16. The apparatus of claim 15, wherein the masking frequency band is of higher frequencies than the attenuation frequency band.

* * * * *